US008346291B2

(12) United States Patent
Guey

(10) Patent No.: US 8,346,291 B2
(45) Date of Patent: Jan. 1, 2013

(54) POWER CONTROL IN A COORDINATED MULTIPOINT SYSTEM

(75) Inventor: Jiann-Ching Guey, Fremont, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 453 days.

(21) Appl. No.: 12/760,521

(22) Filed: Apr. 14, 2010

(65) Prior Publication Data

US 2011/0256901 A1 Oct. 20, 2011

(51) Int. Cl.
  *H04B 7/00* (2006.01)
(52) U.S. Cl. .......................... 455/522; 455/69
(58) Field of Classification Search .............. 455/63.1, 455/67.11, 67.13, 69, 522
  See application file for complete search history.

(56) References Cited

U.S. PATENT DOCUMENTS

2010/0291936 A1 11/2010 Zangi et al.
2010/0323712 A1 12/2010 Guey et al.

FOREIGN PATENT DOCUMENTS

WO WO 2007/126346 A1 11/2007

OTHER PUBLICATIONS

European search report dated Sep. 11, 2012 for European Application No. 11160262.9, 8 pages.

*Primary Examiner* — Raymond Dean

(57) ABSTRACT

A Coordinated Multipoint (CoMP) controller advantageously reduces the transmit powers of transmissions coordinated across a plurality of sub-cells within a CoMP cell. The CoMP controller determines serving sub-cell path gains and interfering sub-cell path gains for a set of mobile terminals to be served by distinct sub-cells. The CoMP controller then evaluates an objective function that expresses an aggregate throughput of concurrent transmissions to be sent to or received from the set of mobile terminals as a function of the serving sub-cell path gains, the interfering sub-cell path gains, and the individual transmit powers of those transmissions, to determine the combination of individual transmit powers that maximizes the aggregate throughput while meeting minimum quality of service requirements for the mobile terminals. The combination of individual transmit powers will necessarily require less power than if the concurrent transmissions were each sent at maximum transmit power.

20 Claims, 8 Drawing Sheets

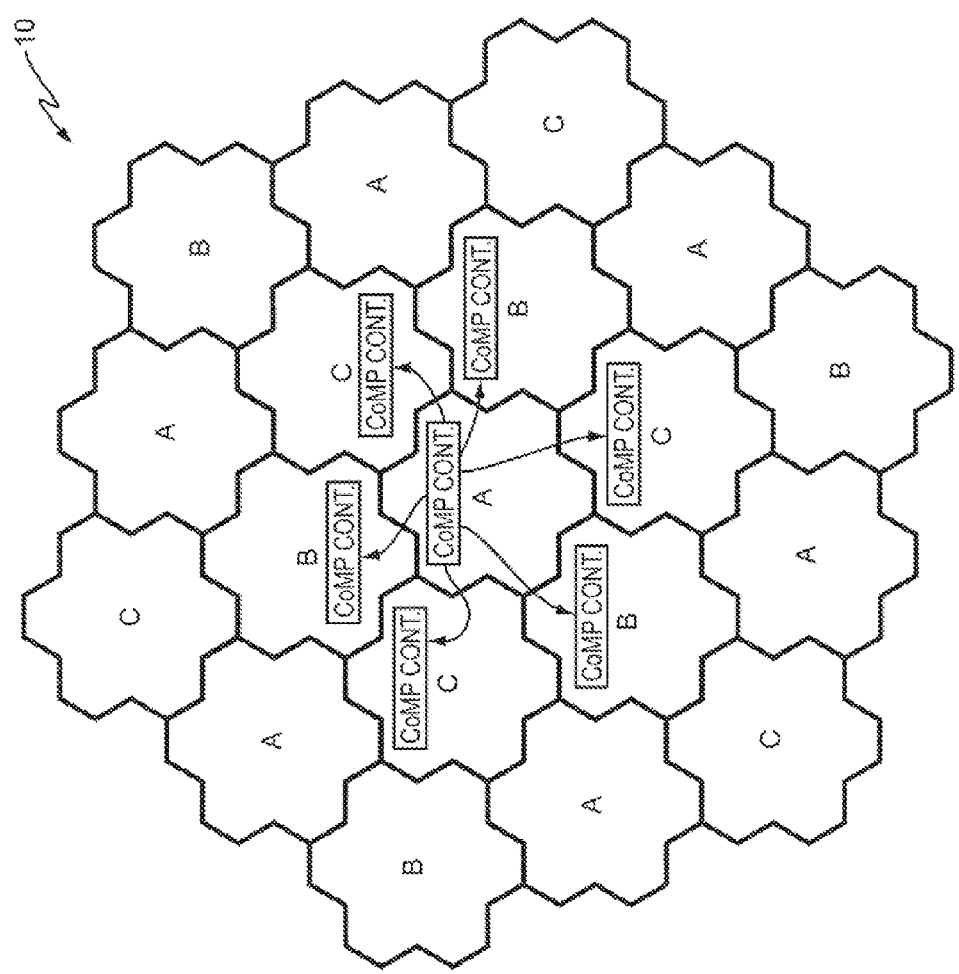

POWER CONTROL IN A COORDINATED MULTIPOINT SYSTEM

TECHNICAL FIELD

The present invention relates generally to a coordinated multipoint (CoMP) system and, more particularly, to a method and apparatus for reducing the power of transmissions in a CoMP system.

BACKGROUND

The phenomenal growth in the demand for wireless communications has put persistent pressure on wireless network operators to improve the capacity of their communication networks. To improve the spectral efficiency of these networks, scarce radio resources have to be reused aggressively in neighboring cells. As a result, inter-cell interference has become a main source of signal disturbance, limiting not only the service quality to mobile terminals at the cell edges, but also the overall system throughput.

A coordinated multipoint (CoMP) system can mitigate inter-cell interference. In a CoMP system, a plurality of geographically contiguous cells—referred to as sub-cells—are grouped together to form a so-called CoMP cell. Each CoMP cell has a central controller that coordinates concurrent transmissions across its constituent sub-cells so as to minimize inter-cell interference within the CoMP cell (referred to herein as inter-sub-cell interference).

Known approaches to coordinating concurrent transmissions across the sub-cells of a CoMP cell send each transmission at maximum power. With each transmission sent at maximum power, these approaches select the set of mobile terminals served by the transmissions so that the mobile terminals in the set each achieve some minimum quality of service requirement (e.g., a minimum signal-to-interference-plus-noise ratio, SINR). While these approaches facilitate a high aggregate throughput of the transmissions, they nonetheless potentially waste a significant amount of power by always transmitting at maximum power.

SUMMARY

Teachings herein advantageously reduce the transmit powers of transmissions coordinated across a plurality of sub-cells within a Coordinated Multipoint (CoMP) cell, while at the same time maximizing the aggregate throughput of the transmissions and maintaining minimum quality of service requirements specified for the served mobile terminals. In some embodiments, for example, the teachings select the set of mobile terminals to be served by the transmissions so that the mobile terminals in the set will each achieve the minimum quality of service requirements if the transmissions are sent at maximum power. Instead of actually sending the transmissions at maximum power, however, the teachings in these embodiments determine the combination of transmit powers that maximizes the aggregate throughput of the transmissions while also meeting the minimum quality of service requirements.

More particularly, a CoMP controller according to one embodiment includes a sub-cell communications interface that communicatively couples the CoMP controller to each sub-cell of the CoMP cell it controls. The CoMP controller further includes a path gain determination circuit and a power allocation circuit. The path gain determination circuit is configured to determine serving sub-cell path gains and interfering sub-cell path gains for a set of mobile terminals to be served by distinct sub-cells within the CoMP cell. The power allocation circuit is configured to accept as input these path gains, minimum quality of service requirements specified for the mobile terminals, and an objective function. The objective function expresses an aggregate throughput of concurrent transmissions to be sent to or from the set of mobile terminals as a function of the serving sub-cell path gains, the interfering sub-cell path gains, and the individual transmit powers of those transmissions. The power allocation circuit evaluates this objective function to determine the combination of individual transmit powers that maximizes the aggregate throughput, while meeting the minimum quality of service requirements specified for the set of mobile terminals.

The combination of individual transmit powers, when determined and allocated in this manner by the power allocation circuit, will necessarily require less power than if the concurrent transmissions were each sent at maximum transmit power. Moreover, the energy efficiency realized by this reduction in transmit power does not compromise the aggregate throughput of the transmissions or the minimum quality of service requirements specified for the mobile terminals. In fact, in many instances, the aggregate throughput and quality of service can be improved.

In some embodiments, the CoMP controller only considers inter-sub-cell interference when determining the combination of individual transmit powers. In other embodiments, though, the CoMP controller further considers inter-CoMP-cell interference caused by transmissions in neighboring CoMP cells. The power allocation circuit in these embodiments is configured to evaluate an objective function that expresses the aggregate throughput also as a function of the individual transmit powers of concurrent transmissions to be sent in one or more neighboring CoMP cells. Of course, to evaluate such an objective function the power allocation circuit must assign some value to these individual transmit powers. In one embodiment, the power allocation circuit has no knowledge about the transmit powers in neighboring CoMP cells and therefore is configured to assign one or more of these transmit powers a value corresponding to a default transmit power (e.g., a maximum transmit power). In another embodiment, however, the power allocation circuit receives an indication of the transmit powers in neighboring CoMP cells and thus is configured to assign one or more of the transmit powers a value according to those received transmit powers.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 5A-5B illustrate power control in a CoMP system, coordinated across multiple CoMP cells according to one embodiment of the present invention.

DETAILED DESCRIPTION

Figure 1:
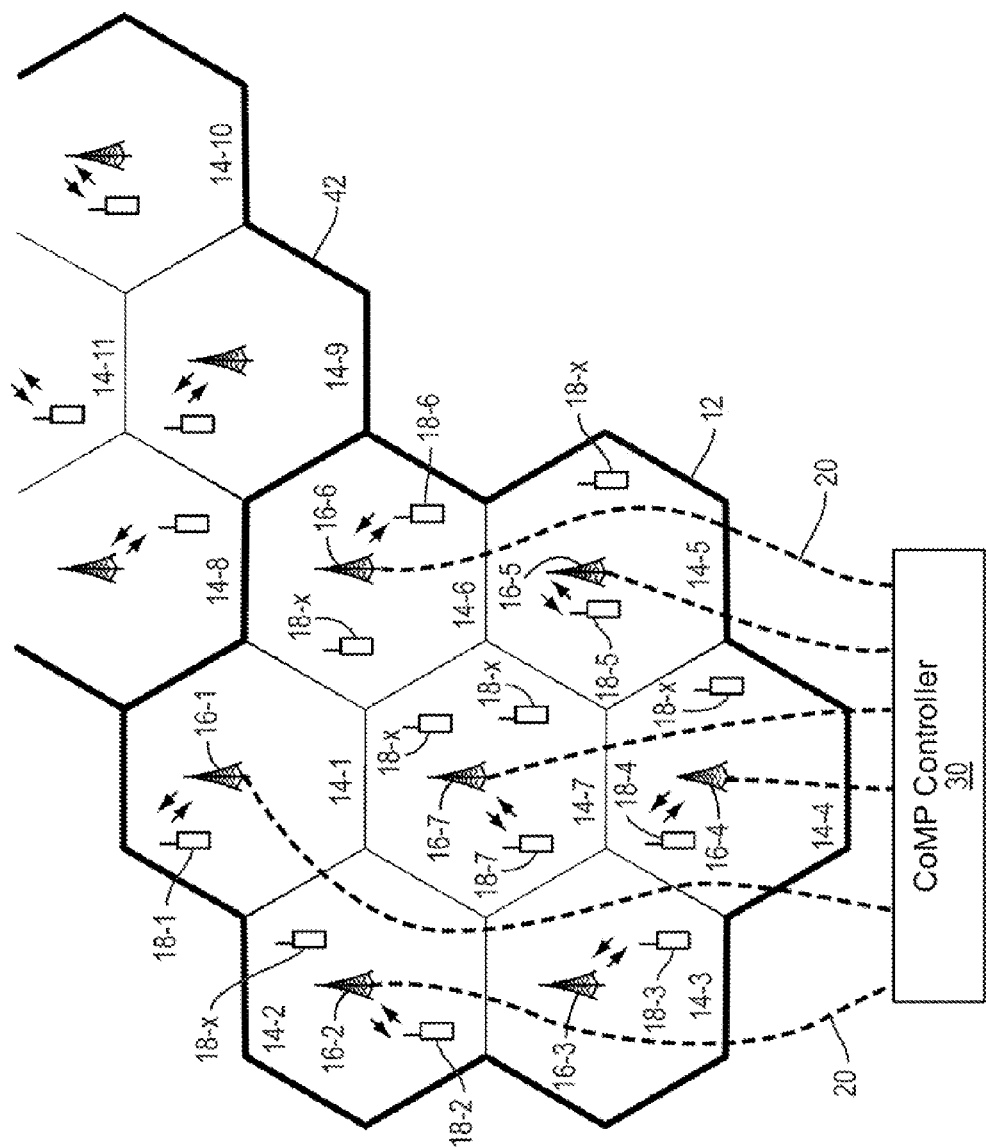
FIG. 1 is a block diagram of a Coordinated Multipoint (CoMP) cell according to one embodiment of the present invention.

FIG. 1 depicts a Coordinated Multipoint (CoMP) system 10 that includes at least one CoMP cell 12. CoMP cell 12 comprises a plurality of geographically contiguous cells 14, referred to as sub-cells 14, distributed across the coverage area of the CoMP cell 12. Each sub-cell 14 includes a corresponding radio access point 16 for serving mobile terminals 18 in that sub-cell 14, such as by transmitting downlink transmissions to those mobile terminals 18 or by receiving uplink transmissions from the mobile terminals 18. Of course, mobile terminals 18 in different sub-cells 14 can be served at the same time using concurrent transmissions. At any given time, therefore, some set S of mobile terminals 18 is served by distinct sub-cells 14 within the CoMP cell 12. As shown in FIG. 1, for example, the set S of mobile terminals {18-1, 18-2, ... 18-7} is currently being served by distinct sub-cells {14-1, 14-2, ... 14-7}, whereas other mobile terminals 18-$x$ may be served at some other time.

With concurrent transmissions being sent to a set S of served mobile terminal 18 in geographically contiguous sub-cells 14, interference between the sub-cells 14 can occur. Accordingly, each sub-cell 14 communicates, e.g., via fiber optic cable 20, with a central controller, namely CoMP controller 30. CoMP controller 30 coordinates concurrent transmissions across the sub-cells 14 so as to minimize the interference between the sub-cells 14; that is, to minimize inter-sub-cell interference. In doing so, CoMP controller 30 is also configured to allocate a reduced amount of power to those transmissions, e.g., relative to a maximum amount of power allocable to the transmissions, while maximizing the aggregate throughput of the transmissions and maintaining minimum quality of service requirements specified for the set S of served mobile terminals 18.

Figure 2:
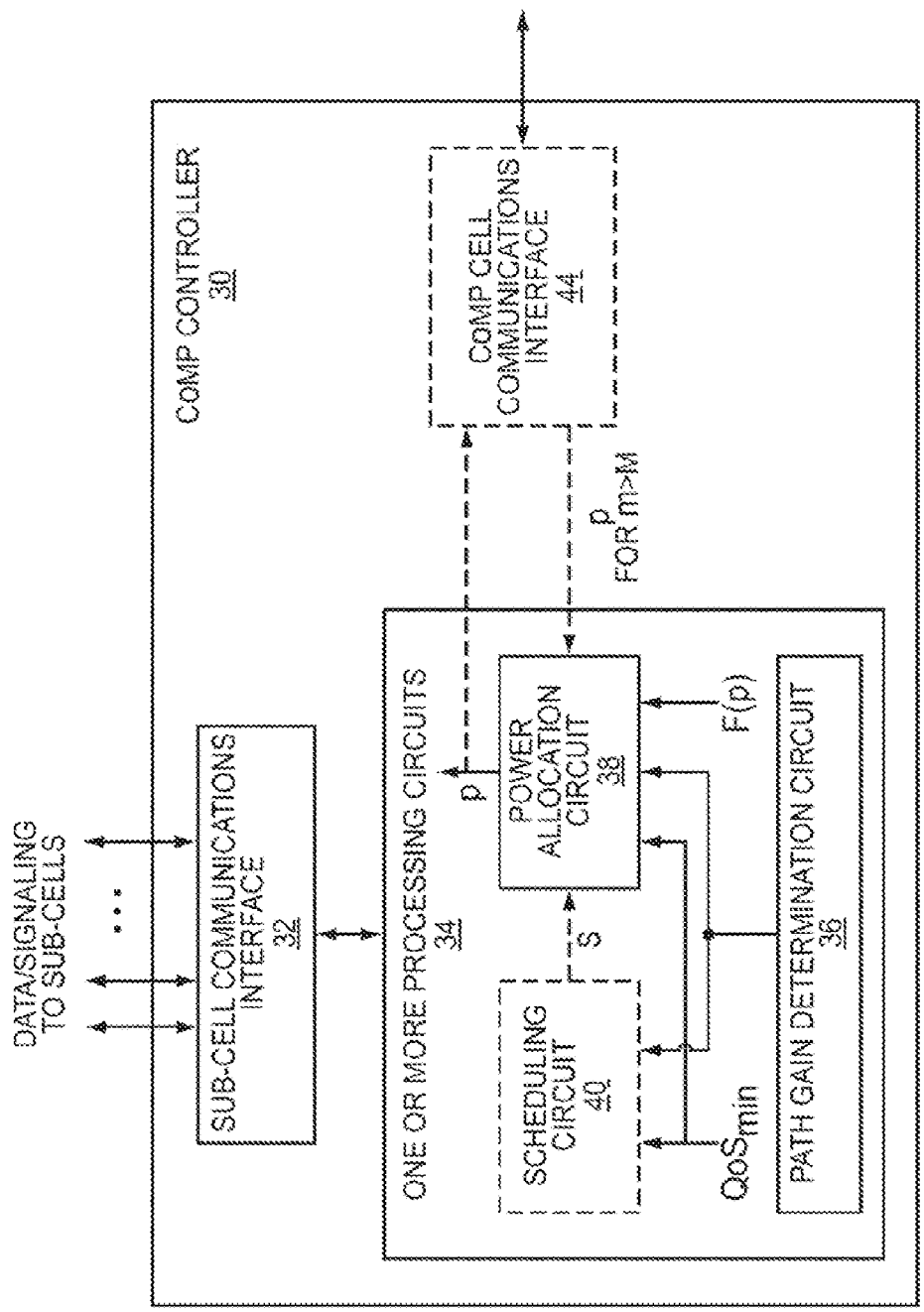
FIG. 2 is a block diagram of a CoMP controller according to one embodiment of the present invention.

FIG. 2, for example, illustrates additional details of the CoMP controller 30 according to various embodiments of the present invention. In FIG. 2, CoMP controller 30 includes a sub-cell communications interface 32 and one or more processing circuits 34, such as path gain determination circuit 36 and power allocation circuit 38. The sub-cell communications interface 32 communicatively couples the CoMP controller 30 to each sub-cell 14. Through this interface 32, the CoMP controller 30 sends or receives user data and control signaling associated with mobile terminals 18.

The path gain determination circuit 36 is configured to determine serving sub-cell path gains and interfering sub-cell path gains for a set S of mobile terminals 18 to be served by distinct sub-cells 14. For example, assuming the set S includes M mobile terminals 18 to be served with concurrent downlink transmissions by M respective sub-cells 14, these path gains can be expressed in one embodiment as:

$$G = \begin{bmatrix} g_{11} & g_{12} & \cdots & \cdots & g_{1M} \\ g_{21} & g_{22} & \cdots & \cdots & g_{2M} \\ \vdots & \vdots & \ddots & & \vdots \\ \vdots & \vdots & & \ddots & \vdots \\ g_{M1} & g_{M2} & \cdots & \cdots & g_{MM} \end{bmatrix}, \quad (1)$$

where the diagonal element $g_{mm}$ corresponds to the serving sub-cell path gain between the $m^{th}$ mobile terminal 18 and its serving sub-cell, and the non-diagonal element $g_{mn}$, for n≠m corresponds to the interfering sub-cell path gain between the $m^{th}$ mobile terminal 18 and the $n^{th}$ sub-cell. Regardless of the particular manner in which they are expressed, the path gain determination circuit 36 provides the path gains G to the power allocation circuit 38.

The power allocation circuit 38 is configured in one embodiment to accept as input these path gains G, minimum quality of service requirements $QoS_{min}$ specified for the set S of mobile terminals 18, and an objective function F(p). The objective function F(p) expresses an aggregate throughput R of concurrent transmissions to be sent to or from the set S of mobile terminals 18 as a function of the serving sub-cell path gains $g_{mm}$, the interfering sub-cell path gains $g_{mn}$, for n≠m, and the individual transmit powers p of those transmissions—where $p=[p_1\ p_2\ \ldots\ p_M]$, with $p_m$ being the power to be allocated for the transmission sent to or from the $m^{th}$ mobile terminal in the set S of M mobile terminals 18, and $p_m$ being less than or equal to a maximum transmit power $p_{max}$. In one embodiment, for instance, the objective function F(p) expresses the aggregate throughput R as:

$$F(p) = R = \sum_{m=1}^{M} \log_e\left(1 + \frac{P_m g_{mm}}{N_o + \sum_{k=1, k \neq m}^{M} p_k g_{mk}}\right) nats/\text{sec/Hz}, \quad (2)$$

where $N_o$ is a constant noise power spectral density. Regardless, the power allocation circuit 38 evaluates the objective function F(p) to determine the combination of individual transmit powers $p=[p_1\ p_2\ \ldots\ p_M]$ that maximizes the aggregate throughput R, while meeting the minimum quality of service requirements $QoS_{min}$ specified for the set S of mobile terminals 18.

The minimum quality of service requirements $QoS_{min}$ may specify any of several different quality metrics (e.g., bit error rate, signal-to-interference-plus-noise ratio, etc.) required of mobile terminals 18 in the set S. In one embodiment, for example, the minimum quality of service requirements $QoS_{min}$ specify a minimum signal-to-interference ratio $SIR_{min}$ required of all mobile terminals 18 in the set S (e.g., 6 dB). In this case, the power allocation circuit 38 evaluates the objective function F(p) to determine the combination of individual transmit powers $p=[p_1\ p_2\ \ldots\ p_M]$ that maximizes the aggregate throughput R, subject to the constraint that $$\frac{p_m g_{mm}}{p_k g_{mk}} \geq SIR_{min}, \text{ for all } k \neq m.$$

The combination of individual transmit powers $p=[p_1\ p_2\ \ldots\ p_M]$, when determined and allocated in this manner by the power allocation circuit 38, will necessarily require less power than if the concurrent transmissions were each sent at maximum transmit power $p_{max}$. Moreover, the energy efficiency realized by this reduction in transmit power does not compromise the aggregate throughput of the transmissions or the minimum quality of service requirements specified for the mobile terminals 18; in fact, in many instances, the aggregate throughput and quality of service are improved.

Figure 3:
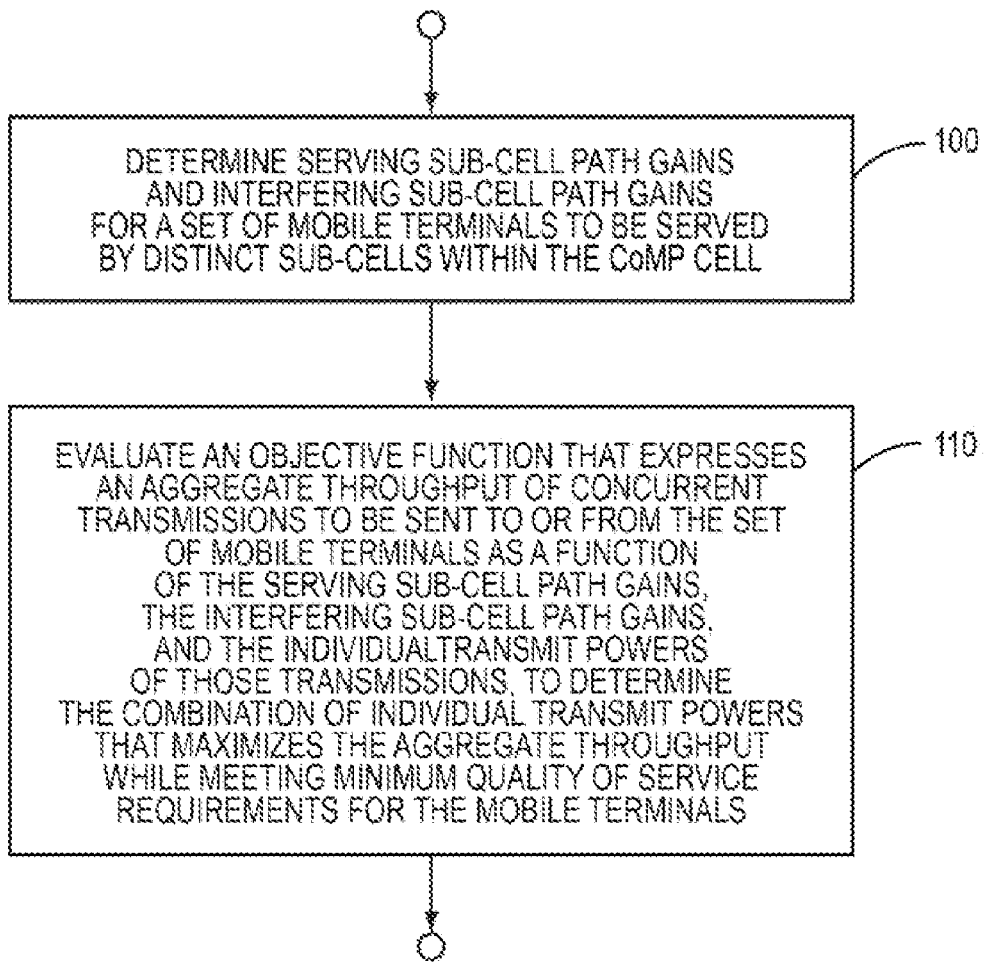
FIG. 3 is a logic flow diagram illustrating a method implemented by a CoMP controller according to one embodiment of the present invention.

With the above points of variation and implementation of the CoMP controller 30 in mind, those skilled in the art will appreciate that the CoMP controller 30 of the present invention generally performs the method illustrated in FIG. 3.

According to FIG. 3, the CoMP controller 30 determines serving sub-cell path gains $g_{mm}$ and interfering sub-cell path gains $g_{mn}$ for a set S of mobile terminals 18 to be served by distinct sub-cells 14 within the CoMP cell 12 (Block 100). The CoMP controller 30 then evaluates an objective function F(p) that expresses an aggregate throughput R of concurrent transmissions to be sent to or from the set S of mobile terminals 18 as a function of the serving sub cell path gains $g_{mm}$, the interfering sub-cell path gains $g_{mn}$, and the individual transmit powers of those transmissions, to determine the combination of individual transmit powers $p=[p_1\ p_2\ \ldots\ p_M]$ that maximizes the aggregate throughput R while meeting minimum quality of service requirements $QoS_{min}$ for the mobile terminals 18 (Block 110).

As described above, the power allocation circuit 38 in the CoMP controller 30 is configured to determine the combination of individual transmit powers $p=[p_1\ p_2\ \ldots\ p_M]$ of concurrent transmissions to be sent to or from some set S of mobile terminals 18. In some embodiments, the set S is just one of several candidate sets of mobile terminals 18 that the CoMP controller 30 is considering for scheduling during a given transmission interval; that is, the power allocation circuit 38 determines a combination of transmit powers for a set S that has not yet been, and may not in fact be, scheduled. In other embodiments, though, the CoMP controller 30 actually schedules the set S of mobile terminals 18 first, whereupon the power allocation circuit 38 then determines a combination of transmit powers for this scheduled set S of mobile terminals 18. FIG. 2 illustrates one example of these latter embodiments.

In FIG. 2, the CoMP controller 30 further includes a scheduling circuit 40. The scheduling circuit 40 is configured to select the set S of mobile terminals 18, e.g., from several candidate sets of mobile terminals 18, as the set that will actually be scheduled for concurrent transmissions during a given transmission interval. In one embodiment, for example, the scheduling circuit 40 selects the set S as the set which meets the minimum quality of service requirements $QoS_{min}$ for concurrent transmissions, if each of those transmissions are sent at a default transmit power $P_{default}$, e.g., the maximum transmit power $p_{max}$. To select the set S in this manner, the scheduling circuit 40 may need to evaluate several candidate sets of mobile terminals 18, to determine which of the candidate sets meets the minimum quality of service requirements $QoS_{min}$ under these conditions. The scheduling circuit 40 in one embodiment determines whether a candidate set meets the minimum quality of service requirements $QoS_{min}$ under these conditions based on the serving sub-cell path gains $g_{mm}$ and the interfering sub-cell path gains $g_{mn}$ for that set. For example, if the minimum quality of service requirements $QoS_{min}$ specify a minimum signal-to-interference ratio $SIR_{min}$ required of all mobile terminals 18 in the selected set S, the scheduling circuit 40 determines if a candidate set satisfies, for all M mobile terminals in the set $$\frac{p_{default}g_{mm}}{p_{default}g_{mk}} = \frac{g_{mm}}{g_{mk}} \geq SIR_{min},$$

for all k≠m. The scheduling circuit 40 may iteratively continue this determination for several candidate sets before selecting the set S to schedule.

Figure 4:
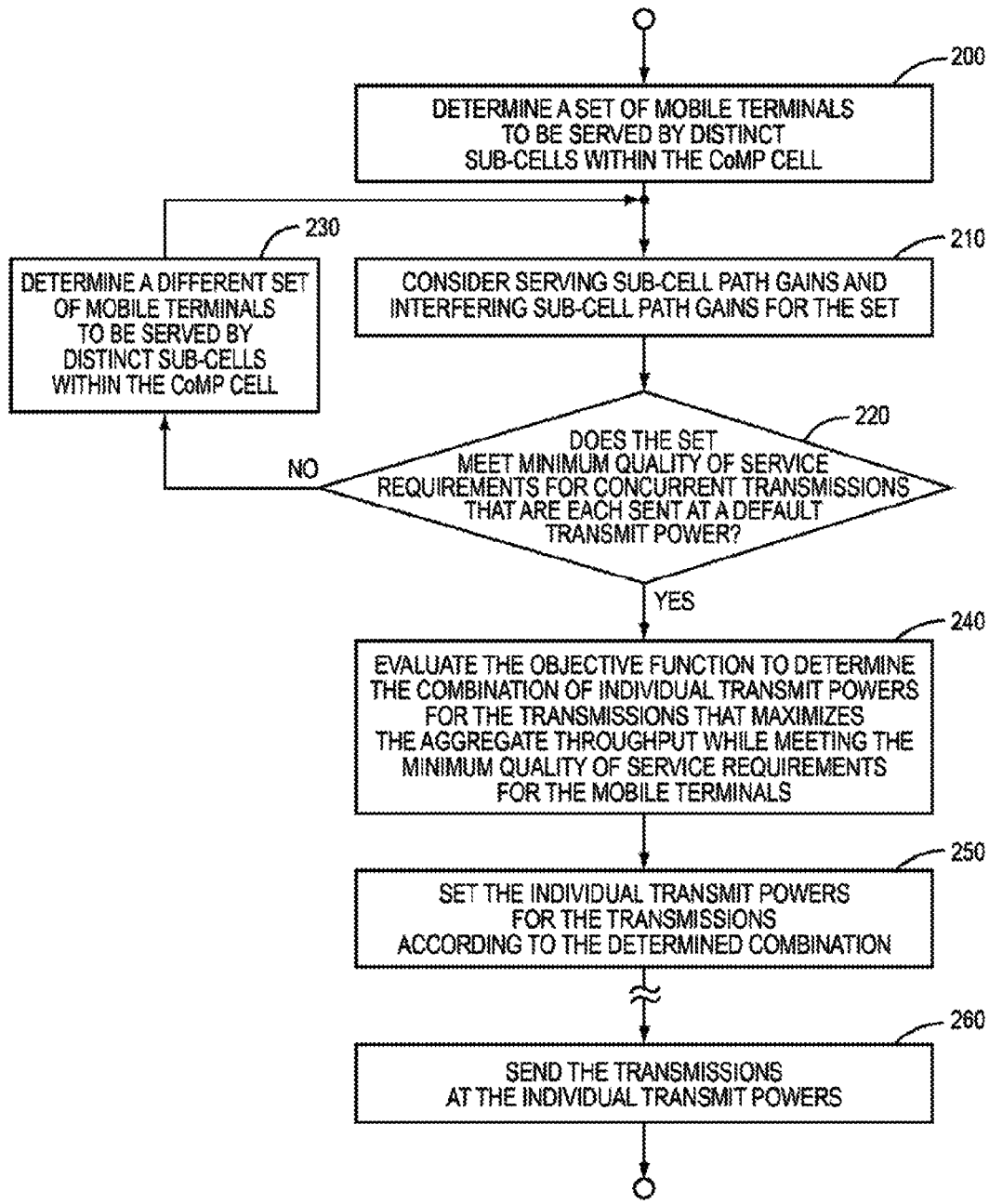
FIG. 4 is a logic flow diagram illustrating a method implemented by a CoMP controller according to another embodiment of the present invention.

FIG. 4 illustrates a method implemented by the CoMP controller 30 that encompasses this embodiment. In FIG. 4, the scheduling circuit 40 initially determines some candidate set of mobile terminals 18 to be served by distinct sub-cells within the CoMP cell 12 (Block 200). The scheduling circuit 40 then considers the serving sub-cell path gains $g_{mn}$ and interfering sub-cell path gains $g_{mn}$ for that candidate set (Block 210). Given these path gains, the scheduling circuit 40 determines whether the candidate set meets the minimum quality of service requirements $QoS_{min}$ for concurrent transmissions that are each sent at a default transmit power $p_{default}$ (Block 220). If not, the scheduling circuit 40 determines a different candidate set of mobile terminals 18 (Block 230) and repeats the above process. That is, the scheduling circuit 40 considers the path gains $g_{mm}$, $g_{mn}$ for this different candidate set (Block 110), and determines whether the set meets the minimum quality of service requirements $QoS_{min}$ for concurrent transmissions that are each sent at a default transmit power $p_{default}$ (Block 220).

Note, though, that the CoMP Controller 30 does not actually send the transmissions at this default transmit power $p_{default}$. Instead, when the scheduling circuit 40 discovers a set S of mobile terminals 18 which, given the path gains $g_{mm}$, $g_{mn}$ for that set, meets the minimum quality of service requirements $QoS_{min}$ for concurrent transmissions that are each sent at a default transmit power $p_{default}$, the scheduling circuit 40 provides that set S to the power allocation circuit 38. The power allocation circuit 38 then determines a combination of individual transmit powers $p=[p_1\ p_2\ \ldots\ p_M]$ for that set S as described above. That is, the power allocation circuit 38 evaluates the objective function F(p) to determine the combination of individual transmit powers $p=[p_1\ p_2\ \ldots\ p_M]$ for the transmissions that maximizes the aggregate throughput R, while meeting the minimum quality of service requirements $QoS_{min}$ specified for the set S (Block 240).

The power allocation circuit 40 then sets the individual transmit powers for the transmissions according to the determined combination $p=[p_1\ p_2\ \ldots\ p_M]$, rather than, e.g., the default transmit power $p_{default}$ (Block 250). At some point thereafter, the CoMP controller 30 actually sends the transmissions at those individual transmit powers (Block 260).

The CoMP controller 30 as described thus far has set the individual transmit powers for concurrent transmissions occurring in the CoMP cell it controls, namely CoMP cell 12, by considering only the inter-sub-cell interference caused by those transmissions. Typically, though, concurrent transmissions occurring in other neighboring CoMP cells cause additional interference referred to as inter-CoMP-cell interference. FIG. 1, for example, illustrates another CoMP cell, CoMP cell 42, that neighbors CoMP cell 12. Concurrent transmissions occurring in sub-cells of CoMP cell 42 {14-8, 14-9, . . . 14-11 . . . } introduce inter-CoMP cell interference to mobile terminals {18-1, 18-2, . . . 18-7} served in CoMP cell 12.

In some embodiments, therefore, the CoMP controller 30 of CoMP cell 12 further considers inter-CoMP-cell interference when setting the individual transmit powers for concurrent transmissions occurring in CoMP cell 12. In these embodiments, the path gain determination circuit 36 is also configured to determine interfering sub-cell path gains $g_{mn}$ between the $m^{th}$ mobile terminal 18 in CoMP cell 12 and the $n^{th}$ sub-cell in another CoMP cell, e.g., CoMP cell 42. These path gains may be provided to the path gain determination circuit 36 from the mobile terminals 18 in CoMP cell 12, or from a CoMP controller of the other CoMP cell, based on the mobile terminal's measurement of a pilot channel transmitted in the other CoMP cell. Regardless, assuming that CoMP cell 42 includes N-M sub-cells that introduce inter-CoMP-cell interference to CoMP cell 12, equation (1) can be modified to express these path gains as:

$$G = \begin{bmatrix} g_{11} & g_{12} & \cdots & \cdots & g_{1M} & g_{1(M+1)} & \cdots & g_{1N} \\ g_{21} & g_{22} & \cdots & \cdots & g_{2M} & g_{2(M+1)} & \cdots & g_{2N} \\ \vdots & \vdots & \ddots & & \vdots & \vdots & & \vdots \\ \vdots & \vdots & & \ddots & \vdots & \vdots & \ddots & \vdots \\ g_{M1} & g_{M2} & \cdots & \cdots & g_{MM} & g_{M(M+1)} & \cdots & g_{MN} \end{bmatrix}, \quad (3)$$

where path gains to the right of the divider correspond to interfering sub-cell path gains $g_{mn}$ between the $m^{th}$ mobile terminal 18 in CoMP cell 12 and the $n^{th}$ sub-cell in CoMP cell 42.

The power allocation circuit 38 in these embodiments is configured to evaluate an objective function F(p) that expresses the aggregate throughput R of concurrent transmissions to be sent to or from the set S of mobile terminals 18 in CoMP cell 12 also as a function of the individual transmit powers of concurrent transmissions to be sent in one or more neighboring CoMP cells, e.g., CoMP cell 42. Equation (2) can likewise be modified to express this objective function F(p) as:

$$F(p) = R = \sum_{m=1}^{M} \log_e\left(1 + \frac{P_m g_{mm}}{N_o + \sum_{k=1,k \neq m}^{N} p_k g_{mk}}\right) nats/sec/Hz, \quad (4)$$

where N>M and, for k>M, $p_k g_{mk}$ corresponds to inter-CoMP-cell interference introduced to the $m^{th}$ mobile terminal 18 in CoMP cell 12 by a transmission sent in the $k^{th}$ sub-cell of a neighboring CoMP cell with transmit power $p_k$. With the objective function F(p) expressing the aggregate throughput R in this way, the minimum quality of service requirements $QoS_{min}$ specified likewise take into account both inter-sub-cell interference and inter-CoMP-cell interference. Accordingly, the power allocation circuit 38 evaluates the objective function F(p) in much the same way as described above; that is, to determine the combination of individual transmit powers $p=[p_1\ p_2\ \ldots\ p_M]$ that maximizes the aggregate throughput R, while meeting the minimum quality of service requirements $QoS_{min}$ specified for the set S of mobile terminals 18.

Of course, to evaluate the objective function F(p) in equation (4), the power allocation circuit 38 must assign some value to the transmit power $p_k$ of transmissions sent in neighboring CoMP cells, i.e., for k>M. In various embodiments, the power allocation circuit 38 is configured to assign to one or more of these transmit powers $p_k$ a value corresponding to a default transmit power $p_{default}$. That is, in these embodiments, the power allocation circuit 38 may not have any knowledge about the transmit power $p_k$ in neighboring CoMP cells. The power allocation circuit 38 therefore determines the transmit power $p=[p_1\ p_2\ \ldots\ p_M]$ in its CoMP cell 12 assuming that the transmit power $p_k$ in those neighboring CoMP cells is a default transmit power $p_{default}$. A conservative approach may be, for example, to assume that the transmit power $p_k$ in neighboring CoMP cells is a maximum transmit power $p_{max}$. The CoMP system 10 in these embodiments remains relatively simple in that neighboring CoMP cells do not need to communicate with one another regarding the transmit power $p_k$ in their CoMP cells.

In other embodiments, neighboring CoMP cells do communicate with one another regarding the transmit power $p_k$ in their CoMP cells. The CoMP controller 30 illustrated in FIG. 2, for example, may further include a CoMP cell communications interface 44 communicatively coupling the CoMP controller 30 to one or more neighboring CoMP cells (i.e., one or more neighboring CoMP controllers). In this case, the power allocation circuit 30 is configured to receive one or more combinations of individual transmit powers already determined for concurrent transmissions to be sent in one or more neighboring CoMP cells. The power allocation circuit 30 then assigns one or more of the individual transmit powers $p_k$ in the objective function F(p) of equation (4), for k>M, values according to the combinations received from neighboring CoMP cells. If the power allocation circuit 30 receives information about the transmit power $p_k$ in some neighboring CoMP cells, but not others, the power allocation circuit 30 assigns a default transmit power $p_{default}$ to those missing transmit powers.

Likewise, the power allocation circuit 38 may be configured in some embodiments to send the combination of individual transmit powers $p=[p_1\ p_2\ \ldots\ p_M]$ it determines to the CoMP controller for one or more neighboring CoMP cells. The CoMP controller for these neighboring CoMP cells may then proceed to determine the combination of individual transmit powers for concurrent transmissions in their respective CoMP cells in much the same way as described above with respect to CoMP controller 30.

Figure 5B:
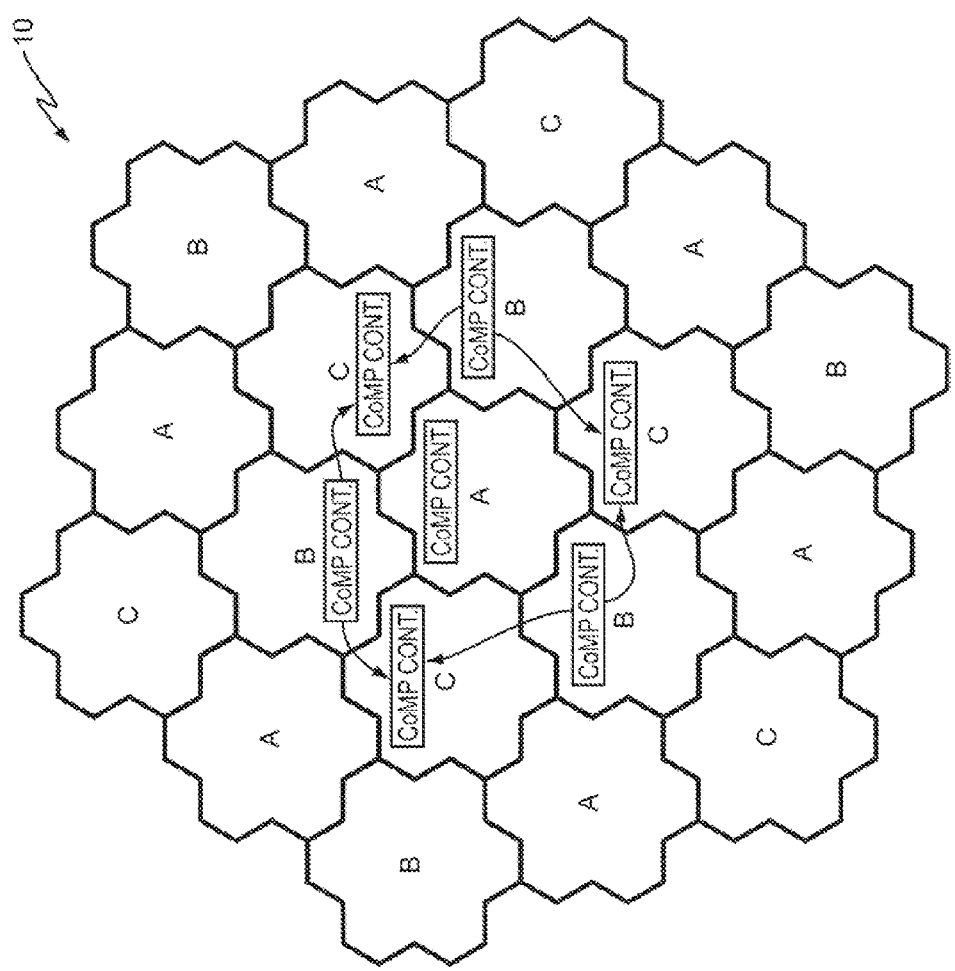

FIGS. 5A-5B illustrate an example of how neighboring CoMP cells communicate with one another regarding the transmit power $p_k$ in their CoMP cells according to one embodiment. In FIGS. 5A-5B, the CoMP system 10 is shown as comprising a plurality of CoMP cells that each belong to one of several groups, depicted by the letters A, B, and C. The CoMP cell groupings are geographically arranged in a pattern, similar to a traditional cellular network frequency reuse pattern, to geographically separate all CoMP cells of each group, or letter. Due to this arrangement, concurrent transmissions in each group of CoMP cells may be independently scheduled for a given transmission interval, and the power for those transmissions independently allocated, since they do not cause interference to each other.

Beginning with one group of CoMP cells, such as the A group in FIG. 5A, the CoMP controllers for CoMP cells in that group each allocate power for concurrent transmissions in their respective CoMP cell during a given transmission interval assuming that the transmit power $p_k$ in neighboring CoMP cells is set at a default transmit power $p_{default}$, e.g., a maximum transmit power $p_{max}$. The CoMP controllers for CoMP cells in the A group then each send information to CoMP controllers for neighboring CoMP cells in the B and C groups that indicates the power allocated in its CoMP cell, as depicted by the outgoing arrows in FIG. 5A.

Upon receiving an indication of the power allocated in neighboring CoMP cells that belong to the A group, the CoMP controllers for CoMP cells in another group, e.g., the B group, likewise each allocate power for concurrent transmissions in their respective CoMP cell during the given transmission interval. In doing so, the CoMP controllers each allocate power assuming that the transmit power $p_k$ in neighboring CoMP cells that belong to the A group is set according to the indication received from those cells, and assuming that the transmit power $p_k$ in neighboring CoMP cells that belong to the C group is set at the default transmit power $p_{default}$. The CoMP controllers for CoMP cells in the B group then send information to CoMP controllers for neighboring CoMP cells which have not yet allocated power, i.e., those belonging to the C group, that indicates the power allocated in its CoMP cell, as depicted by the outgoing arrows in FIG. 5B.

Upon receiving an indication of the power allocated in neighboring CoMP cells that belong to the B group, and having earlier received an indication of the power allocated in neighboring CoMP cells that belong to the A group, the CoMP controllers for CoMP cells in the C group likewise each allocate power for concurrent transmissions in their respective CoMP cell during the given transmission interval. In doing so, the CoMP controllers each allocate power assuming that the transmit power $p_k$ in neighboring CoMP cells that belong to the A and B groups is set according to the indications received from those cells. With all CoMP cells in the system 10 having allocated power for concurrent transmissions to occur in those cells, the concurrent transmissions during the given transmission interval may take place.

Although FIGS. 5A-5B depict only three groups of CoMP cells, any number of groups may be defined. In the case of more than three groups, the process described above continues, with each subsequent group in the sequence allocating power based on information received about the power allocations in previous groups. The CoMP cells belonging to the group that allocates power last in the sequence thereby has information about the power allocations in all neighboring CoMP cells. These CoMP cells therefore generally have better performance than other CoMP cells, since they do not have to conservatively assume that the transmit power $p_k$ in any neighboring CoMP cell is set at the default transmit power $p_{default}$. Accordingly, to ensure fairness among all CoMP cells in the system 10, some embodiments periodically modify the sequence order, e.g., so that, for one time period, CoMP cells belonging to the B group allocate power first, followed by the C group and then the A group, while for another time period, CoMP cells belonging to the C group allocate power first, followed by the A group and then the B group.

Figure 6A:
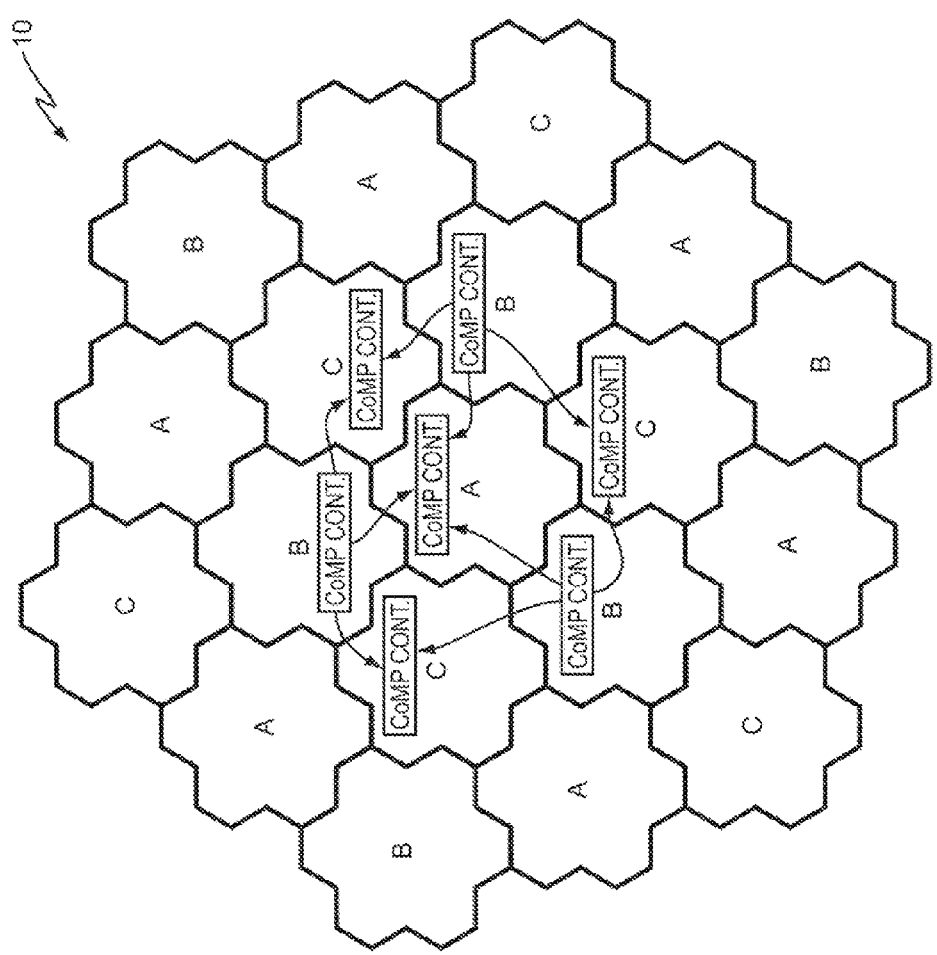
FIGS. 6A-6B illustrate power control in a CoMP system, coordinated across multiple CoMP cells according to another embodiment of the present invention.
Figure 6B:
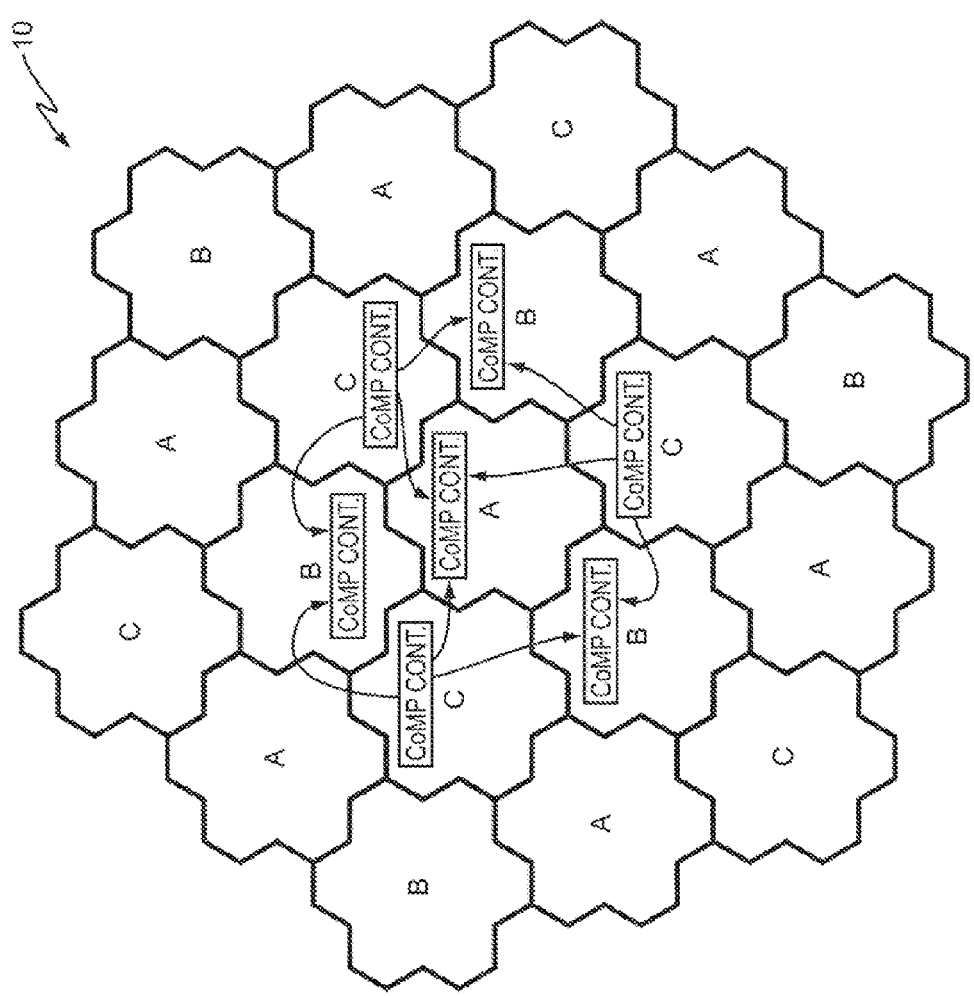

While FIG. 5A-5B illustrated embodiments where a CoMP controller sends its power allocations only to neighboring CoMP cells that have not yet allocated power, FIGS. 6A-6B illustrate embodiments where a CoMP controller sends its power allocation to all neighboring CoMP cells, even those that have already allocated power for the concurrent transmissions during the given transmission interval. FIG. 6A shows, for example, that once CoMP cells belonging to group B have allocated power, the respective CoMP controllers send their power allocations to CoMP cells belonging to either group A or C, even though CoMP cells belonging to group A have already allocated power for the concurrent transmissions. Similarly, FIG. 6B shows that once CoMP cells belonging to group C have allocated power, the respective CoMP controllers send their power allocations to CoMP cells belonging to either group A or B, even though CoMP cells belonging to those groups have already allocated power for the concurrent transmissions.

The CoMP controllers continue this process iteratively until the power allocations determined by the CoMP controllers converge; that is, until each CoMP controller receives power allocations from neighboring CoMP cells that are the same as, or within some pre-determined threshold of, the neighboring CoMP cell power allocations on which it based its own determination of power allocations. If, for example, a CoMP controller for a CoMP cell belonging to group A bases its determination of power allocations on a given assumption about the power allocations in groups B and C, but groups B and C thereafter send the CoMP controller different power allocations, the CoMP controller refines or updates its power allocations based on these newly provided power allocations. However, the number of times a given CoMP controller can update its power allocations, and thereby the number of iterations of this process, may be limited. For example, the path gains on which the power allocations are based may only be accurate for a limited amount of time. Moreover, the process must complete before the given transmission interval during which the concurrent transmissions are scheduled.

Regardless of the precise manner in which a CoMP controller assigns a value to the transmit power $p_k$ of transmissions sent in neighboring CoMP cells, whether by assuming a default transmit power $p_{default}$ or by receiving the actual transmit powers from those CoMP cells, the CoMP controller may evaluate the objective function F(p) to determine the combination of individual transmit powers $p=[p_1 \ p_2 \ \ldots \ p_M]$ as described above in various ways. In one embodiment, for example, the objective function F(p) is a continuous function for which a derivative exists, such as equation (4) previously discussed above:

$$F(p) = R = \sum_{m=1}^{M} \log_e\left(1 + \frac{p_m g_{mm}}{N_o + \sum_{k=1, k \neq m}^{N} p_k g_{mk}}\right) nats/\text{sec/Hz},$$

In this case, the power allocation circuit 38 in the CoMP controller is configured to evaluate the objective function F(p) according to a steepest ascent search algorithm. The steepest ascent search algorithm searches in the line along the gradient direction:

$$\pi(\alpha) = p + \alpha \nabla F^T, \tag{5}$$

where $\nabla F$ is the gradient of the objective function F(p) and $\alpha$ is a non-negative scalar which ranges between 0 and the greatest value that satisfies the constraint $$\frac{p_m g_{mm}}{p_k g_{mk}} \geq SIR_{min}$$

for all $k \neq m$. More particularly, the elements of $\nabla F = [q_1 \ q_2 \ \ldots \ q_M]$ can be defined as:

$$q_n = \frac{\partial F(p)}{\partial p_n} = \frac{g_{nn}}{E_n - p_n g_{nn}} - \sum_{m=1}^{M} \frac{p_m g_{mn} g_{mn}}{E_m(E_m - p_m g_{mm})}, \tag{6}$$

where $$E_m \equiv N_o + \sum_{k=1}^{N} p_k g_{mk}$$

Accordingly, assuming the minimum quality of service requirements $QoS_{min}$ specify a minimum signal-to-interference ratio $SIR_{min}$ required of all mobile terminals 18 in the set S, $\alpha$ must satisfy:

$$\text{for all } 1 \leq m \leq M \begin{cases} 0 \leq \alpha \leq \dfrac{p_{max}}{q_m}, \text{ for } q_m \geq 0 \\ 0 \leq \alpha \leq \dfrac{-p_m}{q_m}, \text{ for } q_m < 0 \end{cases} \tag{7}$$

-continued and for all $1 \le m \le M$
$1 \le i \le N$
$i \ne m$
$\alpha(SIR_{min}q_i g_{mi} - q_m g_{mm}) \le g_{mm} p_m - SIR_{min} g_{mi} p_i,$ where $q_{M+1} = \ldots =_q N = 0,$ since $p_m$ is beyond control for $m > M$ Given the range of α established according to the constraints in equation (7), the power allocation circuit 38 conducts a line search to find the optimal power allocation along that direction. If the set of feasible α is empty, the active variables $p_1$, $p_2$, ... $p_M$ that cause the failure are identified and deactivated, i.e., considered a constant, whereupon a new search begins at the optimal point on the line. This process continues until convergence.

In other embodiments, however, the objective function F(p) is not a continuous function for which a derivative exists. In fact, in a typical COMP system 10, the throughput of any given transmission is determined by a mapping between quality of service requirements and data rates; that is, by a Modulation and Coding Scheme (MCS) table that maps SINR to one of several data rates available at that SINR. This mapping can be expressed as:

$$F(p) = R = \sum_{m=1}^{M} MCS\left(\frac{P_m g_{mm}}{N_o + \sum_{k=1, k \ne m}^{N} p_k g_{mk}}\right) \text{bits/sec/Hz,} \quad (8)$$

where the function MCS has no derivative. For an objective function F(p) without a derivative, the power allocation circuit 38 in one embodiment is configured to evaluate the objective function F(p) according to a coordinate ascent search algorithm. In this case, the power allocation circuit 38 activates only one variable in the objective function F(p) at a time, rotating the active variable $p_m$ in a certain order among all variables $p_1, p_2, \ldots p_M$ until convergence. That is, the power allocation circuit 38 varies the transmit power $p_m$ of the sub-cells 14 one by one, such that:

$\pi(\alpha) = p_m + \alpha,$ (9)

where α must satisfy:

for all $1 \le m \le M \{0 \le p_m + \alpha \le p_{max}$ (10)

and for all $1 \le m \le M$
$1 \le i \le N$
$i \ne m$
$\alpha \ge \frac{SIR_{min} g_{mi} p_i - g_{mm} p_m}{g_{mm}}$ For each given m, the power that maximizes equation (8) can be found. This process continues until convergence.

Of course, the steepest ascent search algorithm and the coordinate ascent search algorithm represents non-limiting examples, and those skilled in the art will appreciate that the power allocation circuit 38 may utilize other algorithms instead. Furthermore, those skilled in the art will appreciate that while many of the examples described above illustrate the present invention in the context of sending concurrent downlink transmissions in a COMP cell, the present invention likewise applies in the context of sending concurrent uplink transmissions in a COMP cell. Moreover, although the examples illustrated the present invention without regard to which frequencies the transmissions were sent with, those skilled in the art will appreciate that the present invention can readily be applied to a frequency selective channel on a per-subcarrier basis.

Accordingly, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:
1. A method implemented by a Coordinated Multi-Point (CoMP) controller for reducing the transmit powers of transmissions coordinated across a plurality of sub-cells within a CoMP cell, the method comprising:
determining serving sub-cell path gains and interfering sub-cell path gains for a set of mobile terminals to be served by distinct sub-cells within the CoMP cell; and
evaluating an objective function that expresses an aggregate throughput of concurrent transmissions to be sent to or from the set of mobile terminals as a function of the serving sub-cell path gains, the interfering sub-cell path gains, and the individual transmit powers of those transmissions, to determine the combination of individual transmit powers that maximizes the aggregate throughput while meeting minimum quality of service requirements for the mobile terminals.
2. The method of claim 1, further comprising selecting the set of mobile terminals as the set which, given the serving sub-cell path gains and interfering sub-cell path gains for that set, meets the minimum quality of service requirements for concurrent transmissions that are each sent at a default transmit power.
3. The method of claim 2, wherein the default transmit power comprises a maximum transmit power.
4. The method of claim 1, wherein the minimum quality of service requirements for the mobile terminals comprise minimum signal-to-interference-plus-noise ratios, SINRs, or minimum signal-to-interference ratios, SIRs, for the mobile terminals, the SINRs or SIRs including both inter-sub-cell interference and inter-CoMP-cell interference.

5. The method of claim 1, wherein evaluating the objective function comprises evaluating an objective function that expresses the aggregate throughput of concurrent transmissions to be sent to or from the set of mobile terminals also as a function of the individual transmit powers of concurrent transmissions to be sent in one or more neighboring CoMP cells.

6. The method of claim 5, wherein evaluating the objective function comprises assigning one or more of the individual transmit powers of concurrent transmissions to be sent in one or more neighboring CoMP cells a value corresponding to a default transmit power.

7. The method of claim 5, further comprising receiving one or more combinations of individual transmit powers already determined for concurrent transmissions to be sent in one or more neighboring CoMP cells, and wherein evaluating the objective function comprises assigning one or more of the individual transmit powers of concurrent transmissions to be sent in one or more neighboring CoMP cells values according to the received one of more combinations of individual transmit powers.

8. The method of claim 1, further comprising sending the combination of individual transmit powers to the CoMP controller for one or more neighboring CoMP cells.

9. The method of claim 1, wherein evaluating the objective function comprises evaluating a continuous function for which a derivative exists, according to a steepest ascent search algorithm.

10. The method of claim 1, wherein evaluating the objective function comprises evaluating a mapping between quality of service requirements and data rates, for which a derivative does not exist, according to a coordinate ascent search algorithm.

11. A Coordinated Multi-Point (CoMP) controller configured to reduce the transmit powers of transmissions coordinated across a plurality of sub-cells within a CoMP cell, the CoMP controller comprising:
  a sub-cell communications interface communicatively coupling the CoMP controller to each sub-cell;
  a path gain determination circuit configured to determine serving sub-cell path gains and interfering sub-cell path gains for a set of mobile terminals to be served by distinct sub-cells within the CoMP cell; and
  a power allocation circuit configured to evaluate an objective function that expresses an aggregate throughput of concurrent transmissions to be sent to or from the set of mobile terminals as a function of the serving sub-cell path gains, the interfering sub-cell path gains, and the individual transmit powers of those transmissions, to determine the combination of individual transmit powers that maximizes the aggregate throughput while meeting minimum quality of service requirements for the mobile terminals.

12. The CoMP controller of claim 11, further comprising a scheduling circuit configured to select the set of mobile terminals as the set which, given the serving sub-cell path gains and interfering sub-cell path gains for that set, meets the minimum quality of service requirements for concurrent transmissions that are each sent at a default transmit power.

13. The CoMP controller of claim 12, wherein the default transmit power comprises a maximum transmit power.

14. The CoMP controller of claim 11, wherein the minimum quality of service requirements for the mobile terminals comprise minimum signal-to-interference-plus-noise ratios, SINRs, or minimum signal-to-interference ratios, SIRs, for the mobile terminals, the SINRs or SIRs including both inter-sub-cell interference and inter-CoMP-cell interference.

15. The CoMP controller of claim 11, wherein the power allocation circuit is configured to evaluate the objective function by evaluating an objective function that expresses the aggregate throughput of concurrent transmissions to be sent to or from the set of mobile terminals also as a function of the individual transmit powers of concurrent transmissions to be sent in one or more neighboring CoMP cells.

16. The CoMP controller of claim 15, wherein the power allocation circuit is configured to assign one or more of the individual transmit powers of concurrent transmissions to be sent in one or more neighboring CoMP cells a value corresponding to a default transmit power.

17. The CoMP controller of claim 15, further comprising a CoMP cell communications interface communicatively coupling the CoMP controller to one or more neighboring CoMP cells, and wherein the power allocation circuit is configured to receive one or more combinations of individual transmit powers already determined for concurrent transmissions to be sent in one or more neighboring CoMP cells, and to assign one or more of the individual transmit powers of concurrent transmissions to be sent in one or more neighboring CoMP cells values according to the received one or more combinations of individual transmit powers.

18. The CoMP controller of claim 11, further comprising a CoMP cell communications interface communicatively coupling the CoMP controller to one or more neighboring CoMP cells, and wherein the power allocation circuit is configured to send the combination of individual transmit powers to the CoMP controller for one or more neighboring CoMP cells.

19. The CoMP controller of claim 11, wherein the power allocation circuit is configured to evaluate the objective function by evaluating a continuous function for which a derivative exists, according to a steepest ascent search algorithm.

20. The CoMP controller of claim 11, wherein the power allocation circuit is configured to evaluate the objective function by evaluating a mapping between quality of service requirements and data rates, for which a derivative does not exist, according to a coordinate ascent search algorithm.

* * * * *

UNITED STATES PATENT AND TRADEMARK OFFICE
CERTIFICATE OF CORRECTION

PATENT NO. : 8,346,291 B2
APPLICATION NO. : 12/760521
DATED : January 1, 2013
INVENTOR(S) : Guey It is certified that error appears in the above-identified patent and that said Letters Patent is hereby corrected as shown below:

In Column 6, Line 2, delete "$g_{mn}$" and insert -- $g_{mm}$ --, therefor.

In Column 11, Line 25, delete "COMP" and insert -- CoMP --, therefor.

In Column 12, Line 20, delete "COMP" and insert -- CoMP --, therefor.

In Column 12, Line 22, delete "COMP" and insert -- CoMP --, therefor.

Signed and Sealed this
Second Day of April, 2013

Teresa Stanek Rea
*Acting Director of the United States Patent and Trademark Office*